Sept. 28, 1943.     D. J. MILLER     2,330,370
APPARATUS AND METHOD FOR MANUFACTURE OF RUBBER TUBING
Filed June 5, 1940     3 Sheets-Sheet 1
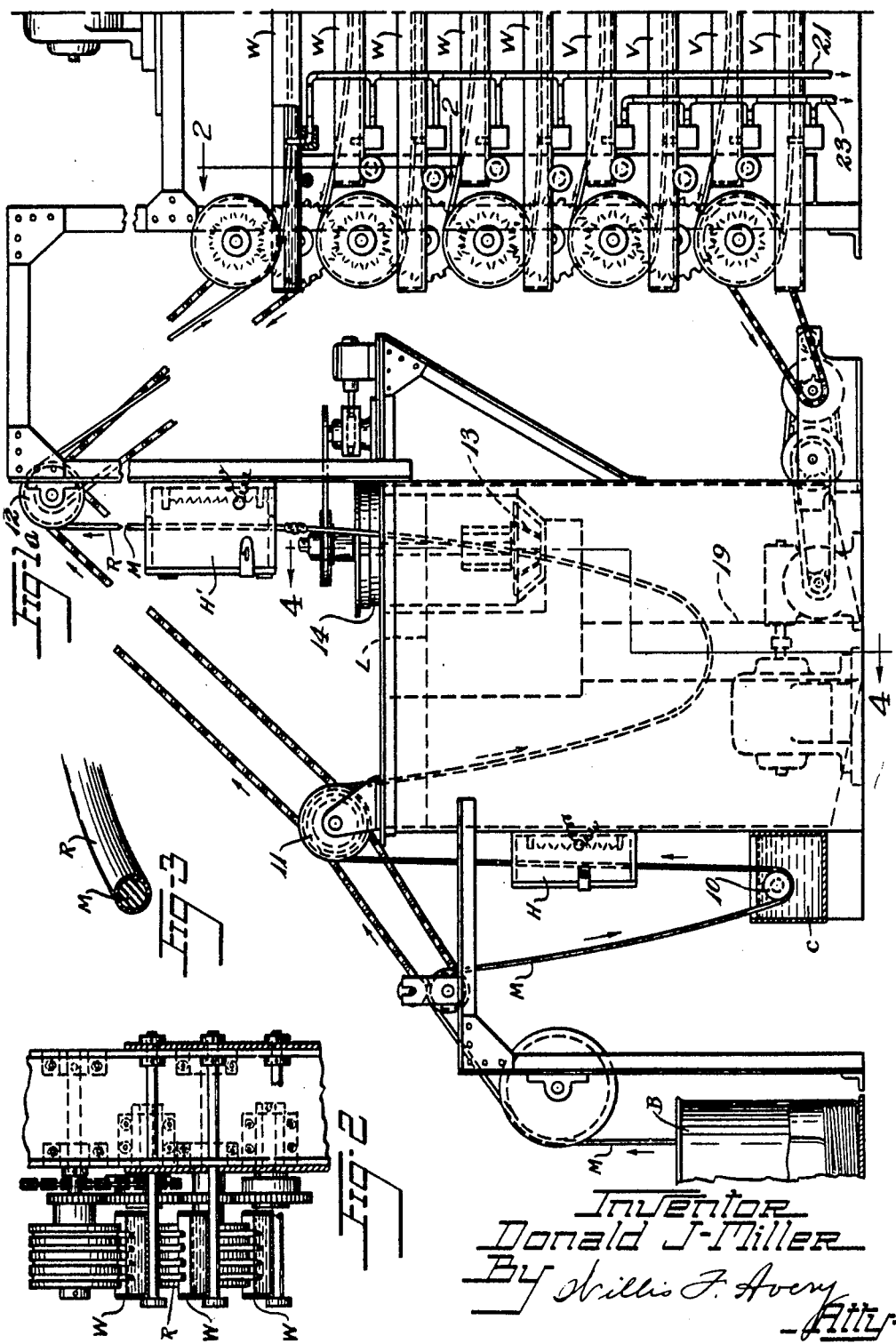
Inventor
Donald J. Miller
By Willis F. Avery
Atty.

Sept. 28, 1943.  D. J. MILLER  2,330,370
APPARATUS AND METHOD FOR MANUFACTURE OF RUBBER TUBING
Filed June 5, 1940  3 Sheets-Sheet 2
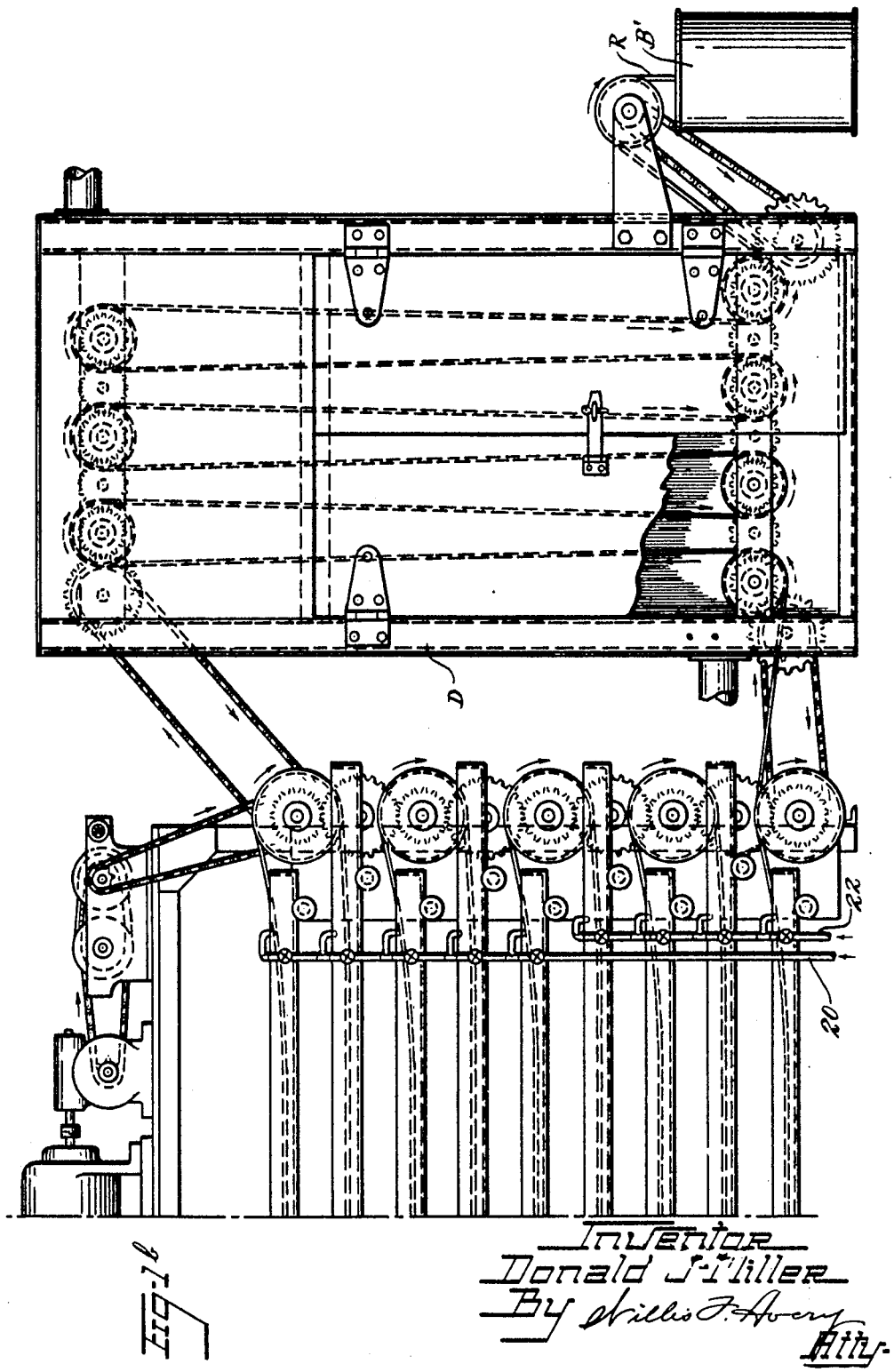

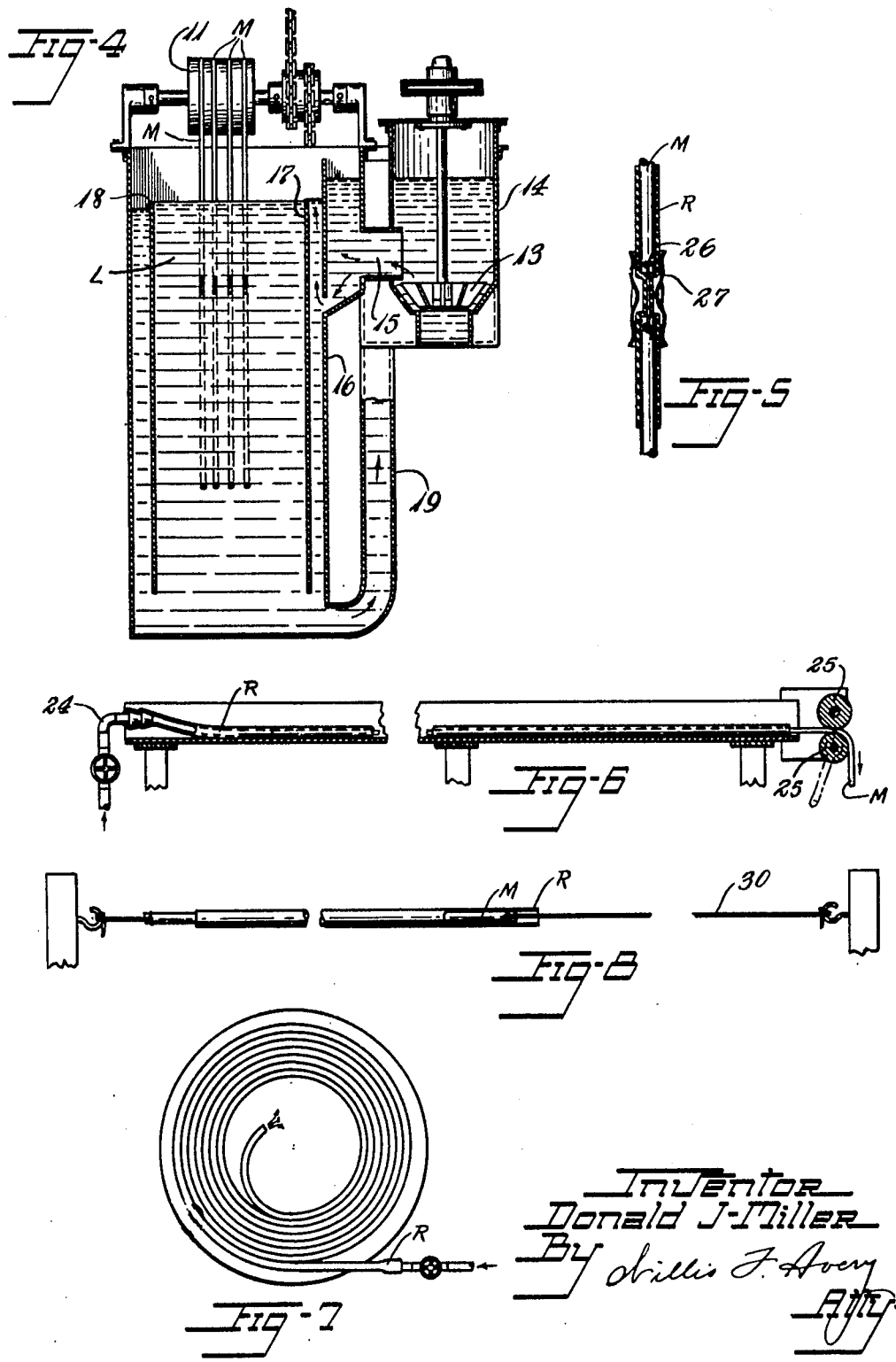

Patented Sept. 28, 1943

2,330,370

UNITED STATES PATENT OFFICE 2,330,370

APPARATUS AND METHOD FOR MANUFACTURE OF RUBBER TUBING

Donald J. Miller, Cuyahoga Falls, Ohio, assignor to The B. F. Goodrich Company, New York, N. Y., a corporation of New York Application June 5, 1940, Serial No. 338,920

18 Claims. (Cl. 18—15)

This invention relates to the manufacture of rubber tubing from aqueous dispersions of rubber, such as latex, and is particularly concerned with the manufacture of long lengths of such tubing in a continuous process.

The general objects of the present invention are to provide efficient and economical procedure and apparatus for manufacturing rubber tubing of uniform size and quality; to provide for coagulating a uniform coating of latex rubber upon a traveling mandrel; to provide for drying the rubber coating; to provide efficient procedure for removing the rubber coating from the mandrel in tube form; to provide coordinated apparatus for efficiently manufacturing rubber tubing in a continuous fashion in relatively long lengths; and to provide apparatus especially adapted for operation under commercial manufacturing conditions requiring certainty of operation with a minimum of attention. The manner in which these and other objects of the invention are attained may readily be understood from the following detailed description of a preferred embodiment of the invention as illustrated in the accompanying drawings, of which Figs. 1a and 1b constitute a diagrammatic side elevation, partially sectioned for clarity of illustration, showing a preferred form of apparatus for manufacturing rubber tubing according to the method of the present invention;

Fig. 2 is a vertical section taken along line 2—2 of Fig. 1a showing the guide pulleys with channels for directing the rubber coated mandrels through a series of wash pans;

Fig. 3 is a cross-sectional perspective view of the mandrel with a rubber deposit thereon;

Fig. 4 is a vertical section taken along line 4—4 of Fig. 1a;

Fig. 5 is an elevation, partially in cross-section, showing a joint between two mandrels coated with rubber and wrapped with an absorbent material;

Fig. 6 is an elevation, partially in cross-section, illustrating one method of removing a mandrel from the rubber tubing;

Fig. 7 is an elevation illustrating a preferred method of drying the rubber tubing;

Fig. 8 is an elevation, partially in cross-section, illustrating another method of removing a mandrel from the rubber tubing.

Considering first the general aspects of the preferred embodiment of the invention illustrated in the drawings, a flexible mandrel M is directed over various pulleys so as to cause the mandrel to pass through a bath of coagulant C for liquid latex, through a heater H for drying the coagulant on the mandrel, then through a body of liquid rubber latex L, to receive a coating of latex rubber coagulum R; and thereafter in succession through a heater H', a washer W, a vulcanizer V, a dryer D, and into a container B' where the mandrel, coated with vulcanized latex coagulum, is coiled.

The mandrel M is made of a flexible material substantially impervious to liquids. In the preferred process the mandrel is rubber, preferably so compounded that the mandrel has a specific gravity of approximately 2 although any rubber compound with a specific gravity that is sufficiently high to cause the mandrel to sink beneath the surface of the compounded latex L, will serve. The mandrel members are in lengths such that, say, fifty feet of finished tubing may be obtained from each mandrel member. One mandrel member is attached to the next by means of string looped through a hole near the end of the member so as to provide a long continuous filamentary mandrel (Fig. 5). In the preferred process the mandrel M is uncoiled from a suitable container B, or may be unwound from a spool, if desired.

In depositing latex rubber coagulum R on a long, moving mandrel M, one of the chief difficulties in providing a smooth, even deposit is the action of the serum that is freed from the latex. This serum has a tendency to flow down the mandrel and gather in sizable amounts between the mandrel and the deposited rubber coagulum. As an important part of this invention I arrange for the serum to break through the rubber coagulum at various spaced points along the traveling mandrel at places where the breaking through will not harm the appearance and uniformity of the finished rubber tubing. To remove this serum after it has broken through I provide absorbent material at these spaced points. Examples of such absorbent materials are cotton cloth, linen cloth, absorbent paper, and the like, with absorbent paper being preferred.

The coagulant C, into which the mandrel is first directed, may be any composition having a coagulating or agglomerating effect upon liquid rubber latex but preferably is a liquid composition containing a polyvalent metal salt dissolved in a volatile organic solvent, together with a minor proportion of a wetting agent, such as any of the coagulant compositions described in the U. S. Patent No. 1,996,090 granted April 2, 1935, to Edward A. Willson. For use in this invention a coagulant solution containing 1100 grams of calcium chloride dissolved in 1000 cubic centimeters of methyl alcohol and containing 200 cubic centimeters of ethyl lactate and 300 cubic centimeters of lactic acid is quite satisfactory.

In a typical embodiment of this invention the mandrel M is led from a container B and into the coagulant solution C, passing under a glass rod 10 which holds the mandrel beneath the surface of the coagulant. From the coagulant the mandrel passes through a small heater H to partially dry the coagulant that is on the mandrel. The mandrel then passes into the compounded latex L. The mandrel hangs freely in the latex describing substantially the path of a catenary. The speed of the mandrel is controlled at two points, one 11 where the mandrel enters the latex and the other 12 where the mandrel leaves the latex. These are regulated so that a loop of the mandrel approximately six feet in length is maintained and that approximately sixteen minutes are required for any given point on the mandrel to move through the latex. In other words about a sixteen minute dip is maintained, which is sufficient to produce a wall thickness of about $\frac{1}{16}$ of an inch. Longer or shorter dips may be used dependent upon the desired thickness of latex coagulum deposited. If desired, more than one coating of latex rubber coagulum may be applied to the traveling mandrel by providing additional reservoirs of coagulant and additional tanks of latex. These would be set up in series with the mandrel entering first the coagulant, then the latex, and so on, until the desired thickness of coagulum had been deposited, dependent, of course, upon the number of coating units provided.

The deposition tank (Fig. 4) and associated latex circulating equipment include features valuable in this invention as well as any invention where a moving mandrel is coated with rubber coagulum. The circulating equipment comprises, as one element, a motor driven impeller 13 driven at a speed of, for example, 70 R. P. M. adjacent the bottom of the cylindrical sump 14. The latex flows from this impeller through a passageway 15 and down through an opening in a baffle 16 where the flowing latex strikes another baffle 17. The latex flows upward against the baffle 17 and over the top of the baffle 17 into the main portion of the tank. The latex from this dipping zone flows over the top of baffle 18 on the opposite side of the tank. Circulation in the latex container tank is maintained by drawing the latex from the bottom of the tank up through the section 19 and back through the impeller 13. This arrangement in the latex tank insures an even concentration of latex in the dipping zone without setting up strong currents which might have a tendency to cause uneven formation of latex coagulum on the mandrel.

A novel feature of this invention is the method provided for removal of the liquid serum from between the mandrel M and the deposited latex coagulum RR. If this serum were allowed to flow down the mandrel it would collect in such large amounts as to distort and rupture the coagulum. To prevent this I arrange for the serum to break through the coagulum at spaced points disposed along the continuous mandrel. These points are preferably at the joints between the individual mandrel members. The mandrel members are connected by pieces of string 26 (Fig. 5) tied adjacent the ends of the mandrels so that there is restricted or interrupted flow of the serum along the mandrel in this area. When the serum flows down the mandrel it comes to one of these restricted joints and can flow no further. It collects here in an amount large enough to break through the coagulum and when it breaks through it is taken up by absorbent material 27 provided at these joints.

The joints in the continuous mandrel are wrapped with absorbent material (Fig. 5) immediately after the traveling mandrel leaves a tank of latex and is removed before the mandrel enters the washer W, or, in case more than one dip is used, before the mandrel enters the next tank of coagulant.

The coated mandrel leaves the latex and passes through a second dryer H' where the coagulum R is dried to a relatively non-deformable state. It is preferred not to dry the coagulum completely before the washing operation and a drying period of one or two minutes at around 120° F. is usually satisfactory at this stage.

The coated mandrel leaves the dryer H' and travels upward over a pulley 12 which is placed sufficiently high above the dryer that the latex rubber coagulum R has time to set to a degree that it will not be deformed by contact with the pulley. From this point the mandrel passes through a series of washing pans W placed one above the other and flowing with fresh water to wash out the soluble salts in the latex coagulum. There should be enough washing pans that a washing period of approximately three hours will be maintained. The lower series of pans constituting the vulcanizer V contain hot water at substantially boiling temperature and this serves to vulcanize the latex coagulum to a solid, resilient rubber. The rubber should be in the vulcanizer for not less than one hour. In the washer W the fresh water flows through a feed pipe 20 and by a manifold arrangement is fed into one end of the pans. The wash water with the dissolved salts from the latex coagulum then flows out an outlet pipe 21. Substantially boiling water flows into the lower pans V through pipe 22 in a similar arrangement and out an outlet pipe 23. To avoid heat losses due to evaporation, the vulcanizer pans may be furnished with hinged covers provided with openings for the entering and exiting mandrel. This is not necessary, however, unless desired.

From the vulcanizer V the mandrel enters the dryer D. The dryer may be heated by circulating hot air at a temperature of about 135° F. One method of heating is by using a unit type steam heater equipped with a blower. The dryer is so constructed that the rubber coated mandrel is kept in the heater for a period of approximately three hours. One method of arranging the dryer is to provide driven rollers at top and bottom of the structure so that the mandrel passes around a bottom roller, over a top roller, back to the bottom, up to the top, and so on as illustrated in the drawings. After passing through the dryer the coated mandrel is deposited in a container B' for removal to the stripping table.

The guide pulleys, the wash pans, and the vulcanizer pans are preferably placed outside the supporting framework of the machine, as shown in Fig. 2, making it simple, in changing mandrels on the machine, to remove one mandrel and start another. By this arrangement it is not necessary to run the mandrel through, over, and around members of the framework of the machine.

It is necessary that the mandrel on which the latex rubber coagulum is deposited should travel through the entire apparatus at a uniform speed which is, in this case, about 22 feet per hour. This requires accurate speed control features on all the motors and driving mechanisms as care must be taken that the mandrel is never put under any tension. These speed control features may be any of the conventional types usually found on the standard variable speed motors and gear reducers.

The compounded latex that is used in this invention in its preferred embodiment as herein given should vulcanize at substantially the boiling temperature of water. A latex composition of 100 parts of rubber, 1.0 part of sulfur, 1.0 part of an organic accelerator, 1.0 part of zinc oxide and 1.0 part of an age resistor, together with the usual protective colloids and stabilizers, is a desirable mixture. The latex composition should contain about 50% solids in its final form in the latex tank.

There are a variety of methods for stripping the rubber tubing from the mandrel. By one method the mandrel members are separated at the joints and then each mandrel member is stretched about 10% between two supports (Fig. 8) to effect a reduction in its cross-sectional size. The rubber tubing may then be slipped from the mandrel onto a cord 30 interposed between one end of the mandrel and a support. By another method the mandrel, covered with its rubber coating, is placed in a trough and one end of the rubber coating is placed over a compressed air outlet 24. The rubber tubing is expanded by the compressed air and the mandrel is withdrawn by drawing it through driven pulleys 25, 25. Removal of the mandrel by both of these methods involves effecting a change in the cross-sectional size of the coating R with respect to the cross-sectional size of the mandrel M.

After the rubber tubing is removed from the mandrel members the members are assembled by joining the ends together and are again run through the process. The rubber tubing is coiled in a tray, placed in a heated drying room for further drying and heated air is blown through the coils (Fig. 7) to dry the inside as well as the outside of the rubber. The final drying is maintained at approximately 120° F. for from 8 to 24 hours.

Rubber tubes in a wide range of sizes may be made according to the invention herein described and will exhibit exceptional uniformity in size and physical characteristics. They are of generally superior quality to rubber tubing made by other methods. The apparatus described here may be operated continuously over long periods of time with a minimum of attention, thereby effecting substantial economies.

The terms "latex" and "liquid rubber latex" have been used in the specification and claims in a broad sense to include not only natural rubber latex but all analogous aqueous dispersions of rubber, synthetic elastics, and similar materials whether in any unvulcanized or vulcanized condition. Such dispersions may be thickened, thinned or otherwise treated and may contain any desired compounding and conditioning agents.

While the invention has been described in considerable detail with reference to certain preferred procedures, apparatus and materials, it is understood that such description is not to be considered limiting and that numerous modifications and variations may be made without departing from the spirit and scope of the invention as defined in the following claims.

I claim:

1. The method of making rubber tubing in long continuous lengths which comprises providing a plurality of filamentary mandrel members formed of flexible material, coupling the ends of the mandrel members together to provide a long continuous filamentary mandrel, causing the prepared mandrel to travel in a continuous fashion along a determinate path, in the course of such travel depositing a coating of latex rubber coagulum on the mandrel by successive treatments thereof with coagulant and with latex, providing serum absorbing material at the joints between the mandrel members, subjecting the rubber coagulum on the mandrel to a finishing treatment adapted to convert the coagulum to a self-sustaining rubber coating, severing the rubber coating at points adjacent the joints between the mandrel members, uncoupling the mandrel members at such joints, removing each mandrel member from within its rubber coating by an operation including the steps of effecting a change in the cross-sectional size of the coating with respect to the cross-sectional size of the mandrel and thereafter withdrawing the mandrel from within the coating, and finally subjecting the rubber coating to a further finishing operation in which both the inside and the outside of the coating are subjected simultaneously to a heated fluid.

2. A method of making rubber tubing in long continuous lengths as defined by claim 1 in which the mandrel members are formed of extensible rubber composition and the removal of the rubber coating from the mandrel is effected by stretching the mandrel to effect a reduction in its cross-sectional size and then removing the coating from the stretched mandrel.

3. The method of making rubber tubing in long continuous lengths which comprises providing a plurality of filamentary mandrel members formed of flexible material, coupling the ends of the mandrel members to provide a long continuous filamentary mandrel, coating the mandrel with latex to produce thereon an enveloping rubber coating constituting a tubular deposit, associating a short length of serum-absorbing material with an exterior local zone of the coated mandrel at each joint between the mandrel members, severing the tubular deposit at the joints between the mandrel members, uncoupling the mandrel members, and removing the tubular rubber deposits from the mandrel members.

4. The method of making rubber tubing in long continuous lengths which comprises providing a plurality of filamentary mandrel members, coupling the ends of the mandrel members to provide a long continuous filamentary mandrel, coating the continuous mandrel with rubber to provide a continuous rubber tubing thereon, severing the tubing at a plurality of points each adjacent to a different one of the mandrel joints, uncoupling the mandrel members, and removing the rubber tubing in a plurality of separate lengths from the respective mandrel members.

5. The method of making rubber tubing which comprises providing a filamentary mandrel formed of freely extensible rubbery material, coating the mandrel with rubber to provide a tubular rubber deposit thereon, said tubular rubber deposit being elastic and resilient, stretching the mandrel to effect a substantial reduction in its cross-sectional size and thereby to free the mandrel from the tubular deposit, and removing the deposit from the mandrel by sliding it lengthwise along the mandrel.

6. The method of making rubber tubing in long continuous lengths which comprises coating a continuous mandrel with latex coagulum and associating a plurality of relatively short lengths of serum-absorbing material with the latex coating at spaced-apart local points.

7. The method of making rubber tubing in long continuous lengths which comprises providing a plurality of filamentary mandrel members formed of flexible material, coupling the ends of the mandrel members to provide a long continuous filamentary mandrel, coating the mandrel with latex rubber to produce thereon an enveloping rubber coating constituting a tubular deposit, said coupling of the ends of the mandrel members being so constructed and arranged as to restrict flow of serum from one mandrel member to the next, and associating a plurality of relatively short lengths of serum-absorbing material with the coated mandrel at a plurality of spaced-apart points adjacent the joints between the mandrel members.

8. Apparatus for making rubber tubing comprising, in combination, a filamentary mandrel comprising a plurality of separate mandrel members coupled in end-to-end relation, said mandrel members being formed of extensible rubbery material, means for causing the mandrel to travel along a determinate path and, disposed along said path, means for applying a coating of latex rubber coagulum to the mandrel comprising means for successively treating the mandrel with coagulent and with latex, means for washing the coagulum, and means for subjecting the coagulum to heat treatment.

9. Apparatus for making rubber tubing comprising, in combination, a filamentary mandrel of relatively great length, means for causing the mandrel to travel in a progressive fashion along a determinate path, and means for depositing rubber from a liquid rubber composition onto said mandrel in the course of such travel, said filamentary mandrel including a plurality of separate mandrel members coupled in end-to-end relation, the coupling being so arranged as to interrupt flow of liquid from one mandrel to the adjacent mandrel.

10. Apparatus for making rubber tubing comprising, in combination, a filamentary mandrel of relatively great length, means for causing the mandrel to travel in a progressive fashion along a determinate path, and means for depositing rubber from a liquid rubber composition onto said mandrel in the course of such travel, said filamentary mandrel including a plurality of separate mandrel members coupled in end-to-end relation, the coupling comprising a string-like member engaging the ends of the mandrel members.

11. Apparatus for making rubber tubing comprising a filamentary mandrel, a tank adapted to contain a liquid rubber composition, and means for causing the mandrel to progress in a catenary-like path through the liquid rubber composition, said filamentary mandrel including a plurality of separate mandrel members formed of extensible rubbery material and being detachably connected in end-to-end relation.

12. The method of making rubber tubing in long continuous lengths which comprises providing a plurality of filamentary mandrel members formed of flexible material, coupling the mandrel members in end-to-end relation to provide a long continuous filamentary mandrel, causing the prepared mandrel to travel in a progressive fashion along a determinate path, in the course of such travel depositing a coating of latex rubber coagulum directly from liquid rubber latex onto the mandrel, subjecting the rubber coagulum on the mandrel to a finishing treatment adapted to convert it to a self-sustaining rubber coating, severing the rubber coating at a plurality of spaced-apart points adjacent the joints between the mandrel members, uncoupling the mandrel members at such points, and removing each mandrel member from within its rubber coating to produce a plurality of long lengths of tubing.

13. The method of making rubber tubing in long continuous lengths which comprises providing a long filamentary mandrel, causing the prepared mandrel to travel in a progressive fashion along a determinate path including an upwardly directed reach, depositing a coating of latex rubber coagulum from liquid rubber latex onto the mandrel in the course of such travel and at a point preceding the said upwardly directed reach, whereby serum materials from the coagulum tend to flow downward along the travelling mandrel, and collecting such serum materials at a plurality of spaced-apart points during the travel.

14. The method of making rubber products which comprises causing a filamentary mandrel to travel in a progressive fashion along a determinate path including an upwardly directed reach, depositing a coating of latex rubber coagulum from liquid rubber latex directly onto the mandrel in the course of such travel and at a point preceding the said upwardly directed reach, whereby serum constituents expelled between the mandrel and the coating tend to flow along the mandrel, and causing the said serum constituents to collect and break through the coating at pre-determined points along the length thereof.

15. The method of making rubber products which comprises causing a filamentary mandrel to travel in a progressive fashion along a determinate path including an upwardly directed reach, depositing a coating of latex rubber coagulum from liquid rubber latex directly onto the mandrel in the course of such travel and at a point preceding the said upwardly directed reach, whereby serum constituents expelled between the mandrel and the coating tend to flow along the mandrel, causing the said serum constituents to collect and break through the coating at pre-determined points along the length thereof, and providing absorbent material at said points to absorb the serum after the breakthrough.

16. Apparatus for making rubber tubing comprising, in combination, a filamentary mandrel comprising a plurality of separate mandrel members coupled in end-to-end relation, said mandrel members being formed of extensible rubbery material, means for causing the mandrel to travel along a determinate path and, disposed along said path, means for applying a coating of latex rubber to the mandrel.

17. Apparatus for making rubber tubing comprising, in combination, a filamentary mandrel comprising a plurality of separate mandrel members coupled in end-to-end relation, said mandrel members being formed of extensible rubbery material, means for causing the mandrel to travel along a determinate path and, disposed along said path, means for applying a coating of latex to the mandrel and means for subjecting the latex coating to heat treatment.

18. The method of making rubber tubing in long continuous lengths, which comprises providing a plurality of filamentary mandrel members formed of flexible material, coupling the mandrel members in end-to-end relation to provide a long continuous filamentary mandrel, causing the prepared mandrel to travel in a progressive fashion along a determinate path, coating the mandrel with latex in the course of such travel, converting the latex to a self-sustaining rubber coating on the mandrel, severing the rubber coating at a plurality of spaced-apart points adjacent the joints between the mandrel members, uncoupling the mandrel members at such points, and removing the mandrel members from their respective rubber coatings to produce a plurality of long lengths of tubing.

DONALD J. MILLER.